United States Patent [19]

Ott et al.

[11] Patent Number: 5,359,545
[45] Date of Patent: Oct. 25, 1994

[54] DYNAMIC VIDEO DISPLAY FOR LOGIC SIMULATION SYSTEMS

[75] Inventors: Douglas E. Ott, Newfoundland; Peter Ditore, Wayne; Thomas Wilderotter, Morris Plains, all of N.J.

[73] Assignee: ITT Corporation, New York, N.Y.

[21] Appl. No.: 166,614

[22] Filed: Dec. 14, 1993

Related U.S. Application Data

[63] Continuation of Ser. No. 867,043, Apr. 10, 1992, abandoned.

[51] Int. Cl.⁵ .............................................. G06G 7/62
[52] U.S. Cl. ...................................... 364/578; 364/488
[58] Field of Search ................ 340/722; 364/578, 488, 364/489, 490

[56] References Cited

U.S. PATENT DOCUMENTS

| | | | |
|---|---|---|---|
| 4,364,036 | 12/1982 | Shimizu | 340/715 |
| 4,516,119 | 5/1985 | Fukuta | 340/722 |
| 4,675,832 | 6/1987 | Robinson et al. | 364/521 |
| 4,791,593 | 12/1988 | Hennion | 364/578 |
| 4,922,445 | 5/1990 | Mizoue et al. | 364/578 |
| 5,051,938 | 9/1991 | Hyduke | 364/578 |
| 5,051,941 | 9/1991 | Takamine et al. | 364/578 |
| 5,105,374 | 4/1992 | Yoshida | 364/578 |
| 5,220,512 | 6/1993 | Watkins et al. | 364/578 |

Primary Examiner—Jack B. Harvey
Assistant Examiner—Jae H. Choi
Attorney, Agent, or Firm—Arthur L. Plevy; Patrick M. Hogan

[57] ABSTRACT

An apparatus and corresponding method for converting static data, obtained for a simulated theoretical logic circuit, into a dynamic visual display. The present invention selectively reads static simulated data produced for a theoretical logic circuit, divides the data into smaller time intervals, synchronizes the time intervals and recursively converts the data contained in each time interval into a graphical waveform image. The waveform images are recursively updated in real-time, thereby creating a dynamic visual display for the waveform.

25 Claims, 7 Drawing Sheets

| TIME | LOGIC STATE (ESYNCH,VIDEO) | TIME | LOGIC STATE (ESYNCH,VIDEO) | TIME | LOGIC STATE (ESYNCH,VIDEO) |
|---|---|---|---|---|---|
| 60000000 | 10 | 64000000 | 10 | 68000000 | 10 |
| 60000125 | 00 | 64000125 | 00 | 68000125 | 00 |
| 60009500 | 01 | 64009300 | 01 ⏋ | 68009100 | 01 |
| 60009600 | 00 | 64009400 | 00 | 68009200 | 00 |
| 60009700 | 01 | 64009700 | 01 ⏌ | 68009700 | 01 |
| 60010100 | 00 | 64010100 | 00 | 68010100 | 00 |
| 60500000 | 10 | 64500000 | 10 | 68500000 | 10 |
| 60500125 | 00 | 64500125 | 00 | 68500125 | 00 |
| 60509500 | 01 | 64509300 | 01 | 68509100 | 01 |
| 60509600 | 00 | 64509400 | 00 | 68509200 | 00 |
| 60509700 | 01 | 64509700 | 01 | 68509700 | 01 |
| 60510100 | 00 | 64510100 | 00 | 68510100 | 00 |
| 61000000 | 10 | 65000000 | 10 | ⎡ 69000000 | 10 ⏋ |
| 61000125 | 00 | 65000125 | 00 | ⎢ 69000125 | 00 ⎢ |
| 61009500 | 01 | 65009300 | 01 | ⎢ 69008900 | 01 ⎢ |
| 61009600 | 00 | 65009400 | 00 | ⎢ 69009000 | 00 ⎢ |
| 61009700 | 01 | 65009700 | 01 | ⎣ 69009700 | 01 ⏌ |
| 61010100 | 00 | 65010100 | 00 | 69010100 | 00 |
| 61500000 | 10 | 65500000 | 10 | 69500000 | 10 |
| 61500125 | 00 | 65000125 | 00 | 69500125 | 00 |
| 61509300 | 01 | 65509300 | 01 | 69508900 | 01 ⏋ |
| 61509400 | 00 | 65509400 | 00 | 69509000 | 00 |
| 61509700 | 01 | 65509700 | 01 | 69509700 | 01 ⏌ |
| 61510100 | 00 | 65510100 | 00 | 69510100 | 00 |
| 62000000 | 10 | 66000000 | 10 | 70000000 | 10 |
| 62000125 | 00 | 66000125 | 00 | 70000125 | 00 |
| 62009300 | 01 | 66009100 | 01 ⏋ | 70008900 | 01 |
| 62009400 | 00 | 66009200 | 00 | 70009000 | 00 |
| 62009700 | 01 | 66009700 | 01 ⏌ | 70009700 | 01 |
| 62010100 | 00 | 66010100 | 00 | 70010100 | 00 |
| 62500000 | 10 | 66500000 | 10 | 70500000 | 10 |
| 62500125 | 00 | 66500125 | 00 | 70500125 | 00 |
| 62509300 | 01 | 66509100 | 01 | 70508900 | 01 |
| 62509400 | 00 | 66509200 | 00 | 70509000 | 00 |
| 62509700 | 01 | 66509700 | 01 | 70509700 | 01 |
| 62510100 | 00 | 66510100 | 00 | 70510100 | 00 |
| 63000000 | 10 | 67000000 | 10 | 71000000 | 10 |
| 63000125 | 00 | 67000125 | 00 | 71000125 | 00 |
| 63009300 | 01 | 67009100 | 01 | 71008900 | 01 |
| 63009400 | 00 | 67009200 | 00 | 71009000 | 00 |
| 63009700 | 01 | 67009700 | 01 | 71009700 | 01 |
| 63010100 | 00 | 67010100 | 00 | 71010100 | 00 |
| 63500000 | 10 | 67500000 | 10 | 71500000 | 10 |
| 63500125 | 00 | 67500125 | 00 | 71500125 | 00 |
| 63509300 | 01 | 67509100 | 01 | 71508700 | 01 ⏋ |
| 63509400 | 00 | 67509200 | 00 | 71508800 | 00 |
| 63509700 | 01 | 67509700 | 01 | 71509700 | 01 ⏌ |
| 63510100 | 00 | 67510100 | 00 | 71510100 | 00 |

FIG. 7

DYNAMIC VIDEO DISPLAY FOR LOGIC SIMULATION SYSTEMS

This is a continuation of application Ser. No. 07/867,043, filed on Apr. 10, 1992, entitled Dynamic Video Display For Logic Simulation Systems, now abandoned.

FIELD OF THE INVENTION

The present invention relates to an apparatus and method for testing simulated logic circuits and, more particularly, to such apparatuses and methods that convert static logic circuit simulation data into a dynamic real-time visual display, allowing a circuit designer to more readily visualize and eliminate design errors prior to the actual physical creation of the logic circuit being tested.

BACKGROUND OF THE INVENTION

Logic simulation is a widely used method of computing the operational performance of theoretical logic circuits for the purpose of verifying a desired circuit operation and eliminating design errors. By using logic simulation, a circuit designer can test a theoretical circuit design by simulating its performance on a computer, thereby saving the cost and time required to build, test and correct an actual physical system. Prior art logic circuit simulators produce output data, either in the form of tabular computer listings or as a static graphical display. While both output formats allow a circuit designer to analyze the operation of a logic circuit, in practice, both computer listings and static displays are very limited in their ability to convey the effects of complex time-varying signals upon the simulated logic circuit being tested.

Complex time-varying signals are common in many applications such as navigation, radar, electronic countermeasure devices and communication systems. The time variations within such applications are often the result of either asynchronous signals from separate sources, pulse trains whose rates vary with time, or objects such as satellites and aircraft that produce relative motion between a signal transmitter and receiver. Regardless of the actual application of a logic circuit that utilizes time varying signals, once the logic circuit is built, it is usually tested using an oscilloscope or like device that produces a realtime visual display of the time varying signals. As will be recognized by a person skilled in the art, a great deal of information concerning the correct operation of a logic circuit is derived from observing the signal waveforms on the oscilloscope as they vary in real time.

When logic circuits that utilize time-varying signals are designed, the use of a real time oscilloscope is not an option until after the circuit is built. In order to test the logic circuit prior to its construction, a logic circuit simulation system must be used. Prior art logic circuit simulation systems produce static outputs. As such, the use of a prior art logic circuit simulation system cannot effectively convey, to a circuit designer, the effects of a time varying test signal on the logic circuit being tested, and a great amount of analytical information concerning the circuit design is lost. Furthermore, as logic circuits become more complex, static data becomes increasingly difficult to interpret. Thus, it has become increasingly difficult to detect design errors, within theoretical logic circuits, prior to the expense and labor of actually creating the complex circuit and testing it with a traditional oscilloscope.

It is therefore a primary objective of the present invention to set forth an apparatus and method whereby static prior art simulation data is converted into real-time video images so that a time-varying nature of a test signal can be visualized as a waveform on a video display. The present invention, therefore, facilitates the oscilloscope-like analysis of a theoretical logic circuit by dynamically displaying the operational performance characteristics of the logic circuit on a screen prior to the physical construction of the circuit being tested.

SUMMARY OF THE INVENTION

The present invention sets forth an apparatus and corresponding method for converting static data, obtained for a simulated theoretical logic circuit, into a dynamic visual display. More particularly, the present invention includes generating simulated output listing data by processing simulated test signals through a theoretical logic circuit, using known techniques. Once the simulated output listing data for a desired theoretical circuit is created, an operator selects which of the simulated test signals, used to generate the simulated output listing data, is to be used in the visual displays. Selected time frames from the simulated output listing data, corresponding to the selected test signals, are then chosen. Each selected time frame is divided into a plurality of smaller time intervals. The time intervals are synchronized with a synchronization signal, either generated by a clock signal generator or contained within the simulated output listing data. The synchronized time intervals corresponding to each selected test signal are then recursively passed through a graphics display driver wherein the data contained within each time interval is converted into a waveform signal. The waveform signal is displayed on a CRT display and the display is constantly updated as the test signal time intervals are recursively entered into the graphics display driver. The conversion of the test signal time intervals to waveform signals is accomplished in substantially real-time, producing a dynamic image on the CRT display.

The dynamic image produced by the present invention allows theoretical logic circuits to be visually analyzed in an oscilloscope-like manner before incurring the labor and expense required to physically create the logic circuit.

BRIEF DESCRIPTION OF THE DRAWINGS

For a better understanding of the present invention, reference is made to the following description of an exemplary embodiment thereof, considered in conjunction with the accompanying drawings, in which:

FIG. 7 is an exemplary numerical output listing of logic simulation results produced by a prior art logic circuit design behavioral simulator system.

DETAILED DESCRIPTION OF THE DRAWINGS

Figure 1:
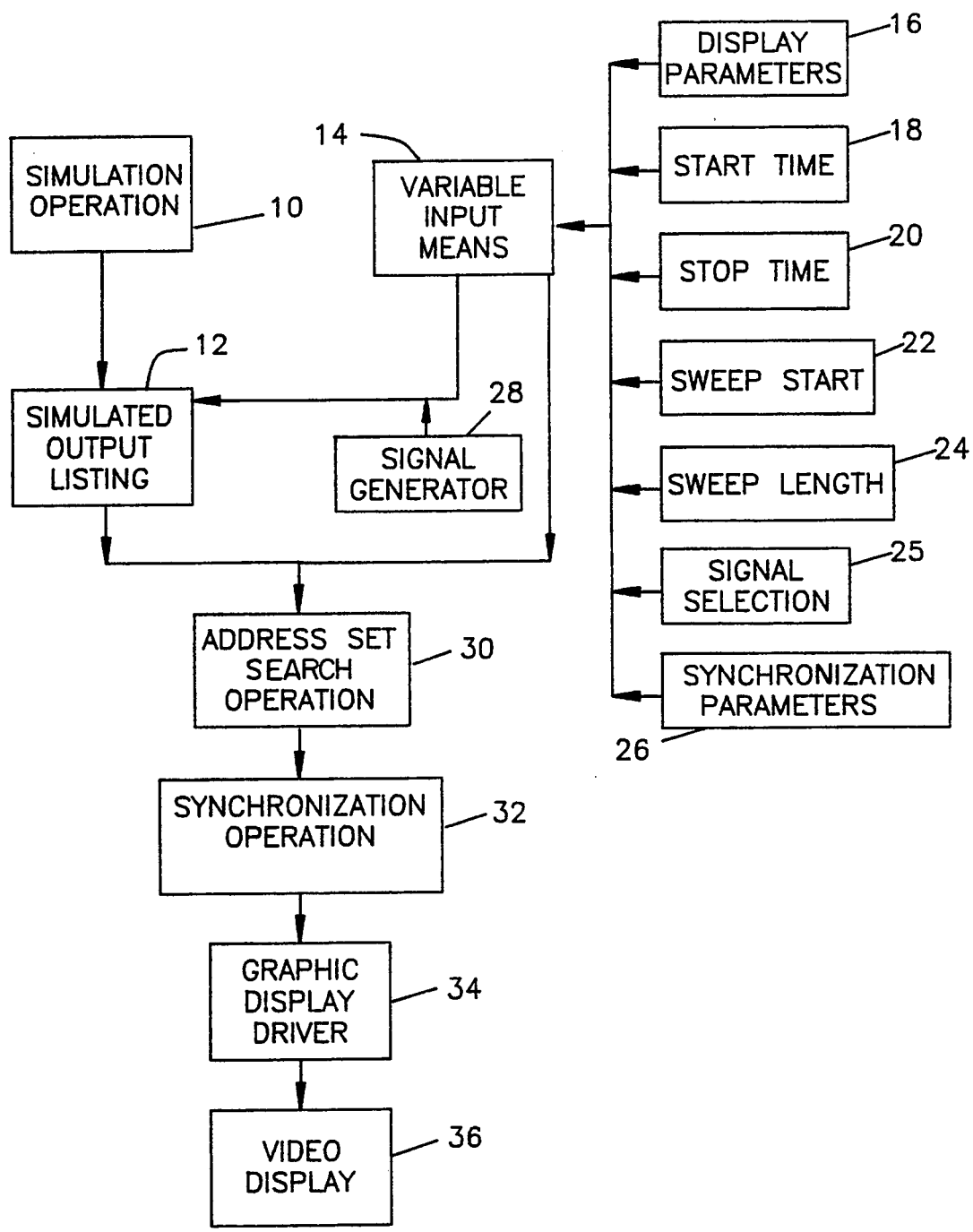
FIG. 1 is a block diagram representation of one preferred embodiment of the present invention.

Theoretical logic circuits are commonly tested using known logic circuit simulation methods. Logic simulation methods produce static tabular computer data corresponding to the performance of the theoretical logic circuit being tested. For example, static logic simulation results can be obtained for a theoretical logic circuit design by use of a behavioral simulator such as the Department of Defense Standard VHDL (VHSIC Hardware Design Language), also referred to as IEEE Standard 1076, or VERILOG ® produced by Cadence, Inc. By using such standard methods, algorithms that simulate a desired theoretical logic circuit are produced. Simulated test data is then inputted into the simulation algorithms and an output listing of simulation data is obtained for the theoretical logic circuit. The performance of the theoretical logic circuit is then analyzed by examining the output listing of simulation data produced. For an example of a typical output listing of simulation data, created by standard methods for a theoretical logic circuit, refer to the output listing of FIG. 7. FIG. 7 shows the simulation output listing data for an exemplary theoretical logic circuit through which were tested two test signals, a ESYNCH signal and a VIDEO signal. The simulation output listing data of FIG. 7 shows the event time progression of the test signals and the corresponding logic state of the test signals at the listed event times. The shown event times in FIG. 7 range from 60,000,000 nanoseconds (nsec) to 71,510,100 nsec and the logic state of the test signals is shown as either one or zero. The simulation output listing of FIG. 7 shows a relatively small run of a simple application where there are only two test signals being processed by the theoretical logic circuit. In the listed simulation output, the two logic signals are moving past each other in time, yet the occurrence and extent of the relative movement between the two sample signals is difficult to detect or visualize from the output listing. For example, referring to FIG. 7, it can be seen that the logic state (01) occurs for the sample test signals at times 64,009,300 nsec and again at 64,009,700 nsec, which are 400 nsec apart. Further along in the simulated output listing, logic state (01) occurs at 66,009,100 nsec and again at 66,009,700, which are 600 nsec apart. Similarly, a logic state (01) occurs at 69,509,700 is 800 nsec after a previous occurrence and a logic state (01) occurs at 71,509,700 nsec, which is 1,000 nsec after a previous occurrence. In view of the above specifics, it can be seen that the test signals used to create FIG. 7 are varying with time. However, from the static simulated output listing of FIG. 7, the time variations between the test signals are hard to interpret and even harder to visualize. FIG. 7 only represents a simple two signal application. In real life applications, logic circuits utilize a large number of time varying signals, therefore the simulated output listings for such circuits would be significantly more complex and difficult to understand than the data exemplified by FIG. 7.

The present invention provides an apparatus and method whereby the data contained within the simulated output listings can be convened into real time waveform images which are produced on a video display. By such a conversion, the time-varying characteristics of multiple test signals can be easily visualized, thereby providing a circuit designer with vital performance characteristics during testing, much in the same manner as an oscilloscope. However, since an oscilloscope can only be used on existing circuits, the present invention allows theoretical circuits to be better tested without the time and expense of actually assembling the circuit.

In FIG. 1 a flow chart for the operation of the present invention apparatus and method is shown. In view of the description of the present invention to follow, it will be recognized by a person skilled in the art that the operation of the present invention, in view of the flow chart of FIG. 1, can be produced using a dedicated system or may be run as software on an existing computer system. The creation of the present invention as part of a dedicated system will be later described while referencing FIG. 2. The operation of the present invention as software on an existing computer system is later described while referencing FIG. 3. The flow chart shown in FIG. 1 is generic to the embodiment of the present invention and is used to show the overall operation of the present invention before embodiment specific features are described.

Referring now to FIG. 1, a simulated output listing 12, such as that shown in FIG. 7, is created for a theoretical logic circuit using standard prior art simulation methods 10. For the purposes of example, it will be assumed that the theoretical logic circuit being designed and tested has produced the simulated output listings 12 that has been set forth in FIG. 7. With the simulated output listing 12 produced, a circuit designer must then use a variable input means 14 to select the variables by which the simulated output listings 12 will be manipulated. As is apparent to persons skilled in the art, the input means 14 would be a keyboard or mouse driven on-screen menu, if the present invention were run as software on an existing computer system. If the present invention were manufactured into a dedicated system, the input means could be a dedicated keypad or like device.

The information entered into the input means 14 of the present invention may also depend upon whether the present invention is a dedicated system or a computer run program. More particularly, the present invention produces a graphical display. As such, if the present invention were run on an existing computer, the display parameters 16, such as screen size, pixel resolution and graphics memory, would have to be entered so as to correspond with the video display of the computer system. If the present invention were constructed into a dedicated unit, such inputs would not be needed, unless the dedicated unit used an independent oscilloscope or other variable display unit as its video display. As will later be described, the display parameters 16 can also be varied by an operator so as to manipulate the viewed image, as desired, on the video display.

The simulated output listing 12, contains a large amount of information concerning the operational parameters of the theoretical logic circuit. The simulated output listing may contain information about how the theoretical logic circuit responded to a single test signal, or how the theoretical logic circuit responded to several test signals. Consequently, when a circuit designer analyzes the simulated output listings 12, the information contained within the simulated output listing 12 is often divided into smaller, more defined areas of interest, so they can selectively be analyzed one section at a time. For example, a circuit designer may want to analyze just one test signal at a time, else the circuit designer may want to examine all of the test signals within a given time frame. In order for the present invention system to allow a circuit designer to choose the sections of the simulated output listing 12 to be analyzed, certain desired variables may be entered into the variable input means 14. Some of the preferred variables inputted include, but are not limited to, STARTTIME 18, STOPTIME 20, SWEEPSTART 22, SWEEPLENGTH 24, SIGNAL SELECTION 25 and SYNCHRONIZATION PARAMETERS 26, the purpose of each variable to be described.

The variable SIGNAL SELECTION 25 is used by the circuit designer to indicate which of the test signals used to create the simulated output listing 12 will be analyzed. If the simulated output listing 12 were that of FIG. 7, the simulated output listing would contain data corresponding to the two test signals ESYNCH and VIDEO, at event times ranging from 60,000,000 nsec to 71,510,000 nsec. If a circuit designer wanted to visually display only one of the two test signals, the test signal desired (either ESYNCH or VIDEO) could be entered as the value for the variable SIGNAL SELECTION 25. If only the one signal were chosen by the SIGNAL SELECTION 25, the operations of the present invention to be visualized would only utilize data within the simulated output listing 12 corresponding to the selected test signal. It should be understood that if the simulated output listing 12 contained data from several test signals, any plurality of signals may be chosen as the SIGNAL SELECTION variables.

With the desired test signals chosen as the variables for the SIGNAL SELECTION 25, a circuit designer may then select the time frame in which the chosen test signals are to be analyzed. A desired time frame is chosen by selecting values for STARTTIME 18 and STOPTIME 20. The STARTTIME 18 indicates at what time event the analysis of the test signals is to begin, and the STOPTIME 20 indicates what time event the analysis of the test signals is to stop. The STARTTIME 18 and the STOPTIME 20 may be chosen to include the entire time frame of the simulated output listing 12 or any portion thereof. For example, if a circuit designer were interested in the simulated output listing 12 from the period of 68,500,000 nsec to 69,500,000 nsec, the STARTTIME 18 would be 68,500,000 nsec and the STOPTIME 20 would be 69,500,000 nsec.

The present system recursively analyzes the simulated output listings 12 in the range chosen between the STARTTIME 18 and the STOPTIME 20. However, the range between the chosen STARTTIME 18 and STOPTIME 20 is often too large, or contain too many waveforms, to be analyzed as a whole. Consequently, the range between the STARTTIME 18 and STOPTIME 20 can be divided into smaller, more readily analyzed segments. Each one of the segments is analyzed separately during a single recursive computation called a "sweep". By recursively sweeping each of the segments, the entire selected range of the simulated output listings 12 is analyzed. The segment of the simulated output listing 12, to be analyzed, during any one given sweep, is determined by the variable values chosen for SWEEPSTART 22 and SWEEPLENGTH 24. The inputted value for SWEEPSTART 22 is a time event value corresponding to the time position within the simulated output listing 12 at which the circuit designer would like the first analyzing sweep of data to begin. The inputted value for SWEEPLENGTH 24 is a time duration value corresponding to the amount of data in the simulated output listing 12 to be analyzed during a single sweep. As will be later explained, the value for the SWEEPSTART 22 is updated recursively so that the entire range of the simulated output listing 12, in between the STARTTIME 18 and STOPTIME 20, is analyzed one SWEEPLENGTH 24 at a time. If a circuit designer chooses to analyze all of the data contained within the simulated output listing 12, in between the chosen STARTTIME 18 and STOPTIME 20, the circuit designer chooses a SWEEPSTART 22 that is equal to the STARTTIME 18. In this manner, the analyzing sweeps begin at the start of the STARTTIME 18 and last until the STOPTIME 20 is achieved. However, if desired, the SWEEPSTART 22 can be set at a time value in between the STARTTIME 18 and the STOPTIME 20, thereby limiting the section of the simulated output listing 12 to be analyzed from the event time of the first SWEEPSTART 22 to the STOPTIME 20.

Since the simulated output listing 12, in between the STARTTIME 18 and the STOPTIME 20, can be divided into smaller segments that are recursively analyzed, it is desirable in many applications to synchronize the individual sweeps to a common synchronization signal. The SYNCHRONIZING PARAMETERS 26 chosen by the circuit designer control the characteristics of the synchronization signal. The synchronization signal may be chosen from one of the test signals contained within the simulated output listings data 12, or the synchronization signal may be produced by a clock signal generator 28. Regardless of the origin of the synchronization signal, the synchronization signal may be delayed or advanced in time by varying the SYNCHRONIZATION PARAMETERS 26.

To explain the operation of the present invention system, it will be assumed that the values of the simulated output listings 12 are represented by FIG. 7. For the purposes of example, the following variable inputs are also assumed to have been entered into the input means 14: STARTTIME=60,000,000 nsec, STOPTIME=71,510,100 nsec, SWEEPSTART=69,000,000 nsec, and SWEEPLENGTH=20,000 nsec. Both the ESYNCH test signal and the VIDEO test signal are chosen as the SIGNAL SELECTION variables and the ESYNCH test signal of the simulated output listing 12 is chosen as the synchronizing signal. With the STARTTIME 18 chosen at 60,000,000 nsec and the STOPTIME 20 chosen at 71,510,100 nsec, it can be seen that the entire simulated output listing 12 of FIG. 7 has been chosen as the field of interest. By selecting the ESYNCH test signal as the synchronization signal, it can be seen that a synchronization trigger (Logic 1) occurs originally at 60,000,000 nsec, and then at every 500,000 nsecs thereafter (i.e., 60,500,000 nsec, 61,000,000 nsec, etc.).

With the simulated output listings 12, computed and the input variables chosen, an address set search operation 30 is conducted on the simulated output listings 12. During the address set search operation 30, the simulated output listings 12 are recursively searched until an event time is found within the simulated output listing 12 that is equal to, or greater than, the event time chosen for the variable SWEEPSTART 22. Since the value for SWEEPSTART 22 was chosen at 69,000,000 nsec, the analysis of the data contained within the simulated output listing 12 will begin at 69,000,000 nsec. Table One below shows a small segment of the simulated output listings 12, reproduced from FIG. 7, that includes the value for SWEEPSTART 22, and is so indicated.

TABLE ONE

| TIME (NSEC) | LOGIC STATE (ESYNCH, VIDEO) | |
| --- | --- | --- |
| 68509200 | 00 | |
| 68509700 | 01 | |
| 68510100 | 00 | |
| 69000000 | 10 | SWEEPSTART |
| 69000125 | 00 | |
| 69008900 | 01 | |
| 69009000 | 00 | |
| 69009700 | 01 | |
| 69010100 | 00 | |
| 69500000 | 10 | |

When the SWEEPSTART 22 is chosen and its address is found within the simulation output listing 12, by the address set search operation 30, a synchronization operation 32 is performed. During the synchronization operation 32, the nearest synchronizing trigger of the synchronizing signal, that occurs on, or after, the SWEEPSTART 22, is found. If the synchronizing trigger does not occur at the same event time as the chosen SWEEPSTART 22, the chosen SWEEPSTART 22 is changed to the event time of the next occurrence of the synchronizing trigger. For example, it can be seen in Table One that the chosen SWEEPSTART 22 of 69,000,000 nsec occurs at the same point as a synchronizing trigger (i.e. ESYNCH is at logic 1 at 69,000,000 nsec). However, if the value for SWEEPSTART 22 were chosen at 68,509,700 nsec, the event time of the SWEEPSTART 22 would automatically be advanced to the event time of the next synchronizing trigger, which is 69,000,000 nsec.

Once the value of SWEEPSTART 22 passes through the synchronization operation 32, and is set at the nearest proceeding synchronizing trigger, the end of the sweep is computed by adding the event time of the SWEEPSTART 22 to the time duration value of the SWEEPLENGTH 24. In the chosen example, the event time of SWEEPSTART 22 was entered at 69,000,000 nsec and the time duration value of the SWEEPLENGTH 24 was chosen at 20,000 nsec. As such, it can be seen that the first sweep will end at 69,020,000 nsec.

With the value of the SWEEPSTART 22 and the length of the sweep known, the values contained within the simulated output listing 12, that are covered by the sweep, are passed through a graphics display driver 34 and converted into waveform images. The waveform images are then displayed on a video display 36 which may include an oscilloscope, dedicated CRT or a computer display device, depending on the chosen embodiment of the invention.

Figure 2:
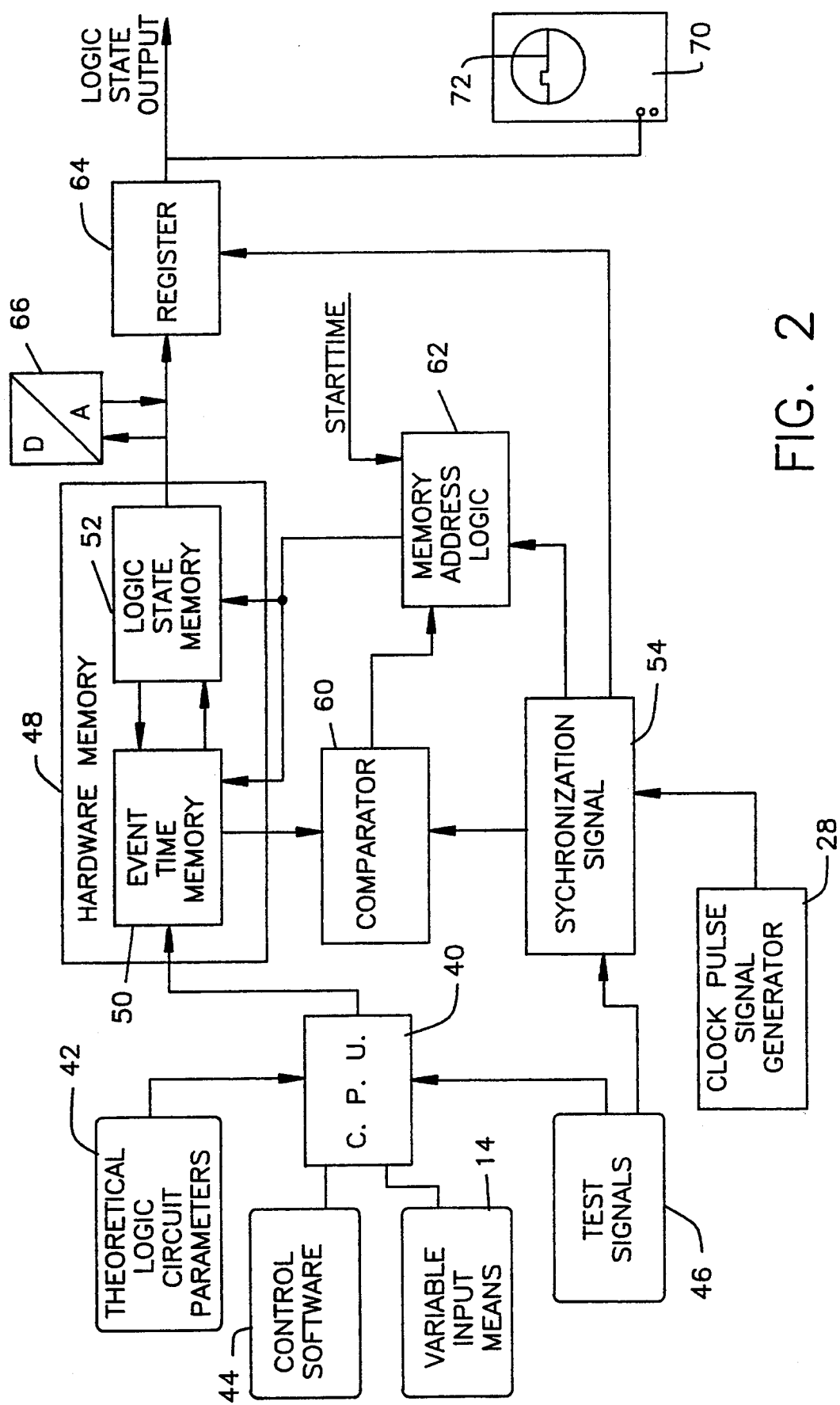
FIG. 2 is a schematic block diagram of a preferred embodiment of the present invention formed as a dedicated apparatus.

Referring to FIG. 2, an exemplary embodiment of the present invention is shown, formed as a dedicated apparatus. The shown embodiment includes a central processing unit (C.P.U.) 40 that can be formed as dedicated circuits or may be a self-contained unit such as a personal computer. Inputted into the C.P.U. 40, by a circuit designer, are the theoretical logic circuit parameters 42 that define the performance of the theoretical logic circuit that has been designed, and is now being tested. Control software 44 is loaded into the C.P.U. 40. The control software 44 contains a known mathematical method of generating static simulated output listing for a given theoretical logic circuit design. Also entered into the C.P.U., are the simulated test signals 46 used by the control software 44 to test the theoretical logic circuit design and thereby create a simulated output listing. Lastly, a variable input means 14 is used to enter the variable values for STARTTIME 18, STOPTIME 20, SWEEPSTART 22, SWEEPLENGTH 24 and SIGNAL SELECTION 25 into the C.P.U. 40. The variable input means 14 can be either a computer keyboard or a dedicated control pad.

Referring to FIG. 2 in conjunction with FIG. 1, it can be seen that the simulation operation 10, needed to produce the simulated output listing 12, is conducted by the C.P.U. 40. The C.P.U. 40 generates the simulated output listing by running the control software 44 with the inputted theoretical logic circuit parameters 42 and the inputted test signals 46. As has been previously explained, the simulated output listing 12, for a given simulated logic circuit, contains the logic states (0 or 1) for the various test signals 46 at given event times. Areas of interest within the simulated output listing 12 are then selected by entering values for STARTTIME 18, STOPTIME 20 and SIGNAL SELECTION 25, into the variable input means 14 as has been previously described.

In the embodiment of FIG. 2, the address set search operation 30 is also performed by the C.P.U. The C.P.U. 40 searches the simulated output listing 12 until a time event value is found that is equal to, or greater than, the time event chosen for the SWEEPSTART 22. Again, only data, corresponding to the test signals 46 chosen as the SIGNAL SELECTION 25, is used in the address set search operation. With the SWEEPSTART 22 found, the data within the simulated output listing 12, corresponding to the selected test signals, is read into a hardware memory circuit 48. Data is only read into the hardware memory circuit 48 until an event time is incurred that is equal to, or greater than, the variable selected as the STOPTIME 20.

Within the hardware memory circuit 48, is an event time memory circuit 50 and a logic state memory circuit 52. The event time memory reads and stores the various event times contained within the inputted simulated output listing 12. Similarly, the logic state memory 52 reads and stores the logic states within the simulated output listing 12 that correspond to the stored event times.

A synchronization signal 54 is either selected from one of the test signals 46 or is created from a clock pulse signal generator, such as a crystal oscillator. In the shown embodiment of the present invention, the synchronization operation 32 is conducted via a comparator 60 and a memory address logic circuit 62. Regardless of its origin, the synchronization signal 54 is read to the comparator 60. Additionally, the event times stored within the event time memory circuit 50 are also read to the comparator 60. The comparator compares the stored event times to the synchronization signal 54, identifying what event time occurs at the synchronizing triggers of the synchronization signal 54. The memory address logic circuit 62 then compares the event times of the synchronizing triggers to the current value chosen for SWEEPSTART 22. Of the current value chosen for SWEEPSTART 22 does not occur at the same event time as a synchronizing trigger, the SWEEPSTART 20 is advanced in time to the next synchronizing trigger. Consequently, the SWEEP-START 20 is synchronized to synchronization signal 54.

Once the SWEEPSTART 22 is synchronized to the synchronization signal 54, the data contained within the hardware memory 48 is read to a register 64. The register 64 stores the memory output as either a digital signal or an analog signal depending on the use, or non-use, of a signal converter 66.

The register 64 is coupled to the synchronization signal 54, whereby the register 64 is read to a video display means 36, such as an oscilloscope 70, at each occurrence of a synchronizing trigger. The oscilloscope 70 reads the output of the register 64, creating a visual image of any logic state changes in the form of a waveform 72. Since the register 64 is read to the oscilloscope 70, at each occurrence of a synchronizing trigger, the image on the oscilloscope is recursively updated. If the synchronization signal 54 is a real-time signal, as is used in the preferred embodiment, the image on the oscilloscope is updated in real-time and the recursively updated waveform 72 becomes a dynamic real time image.

Figure 3:
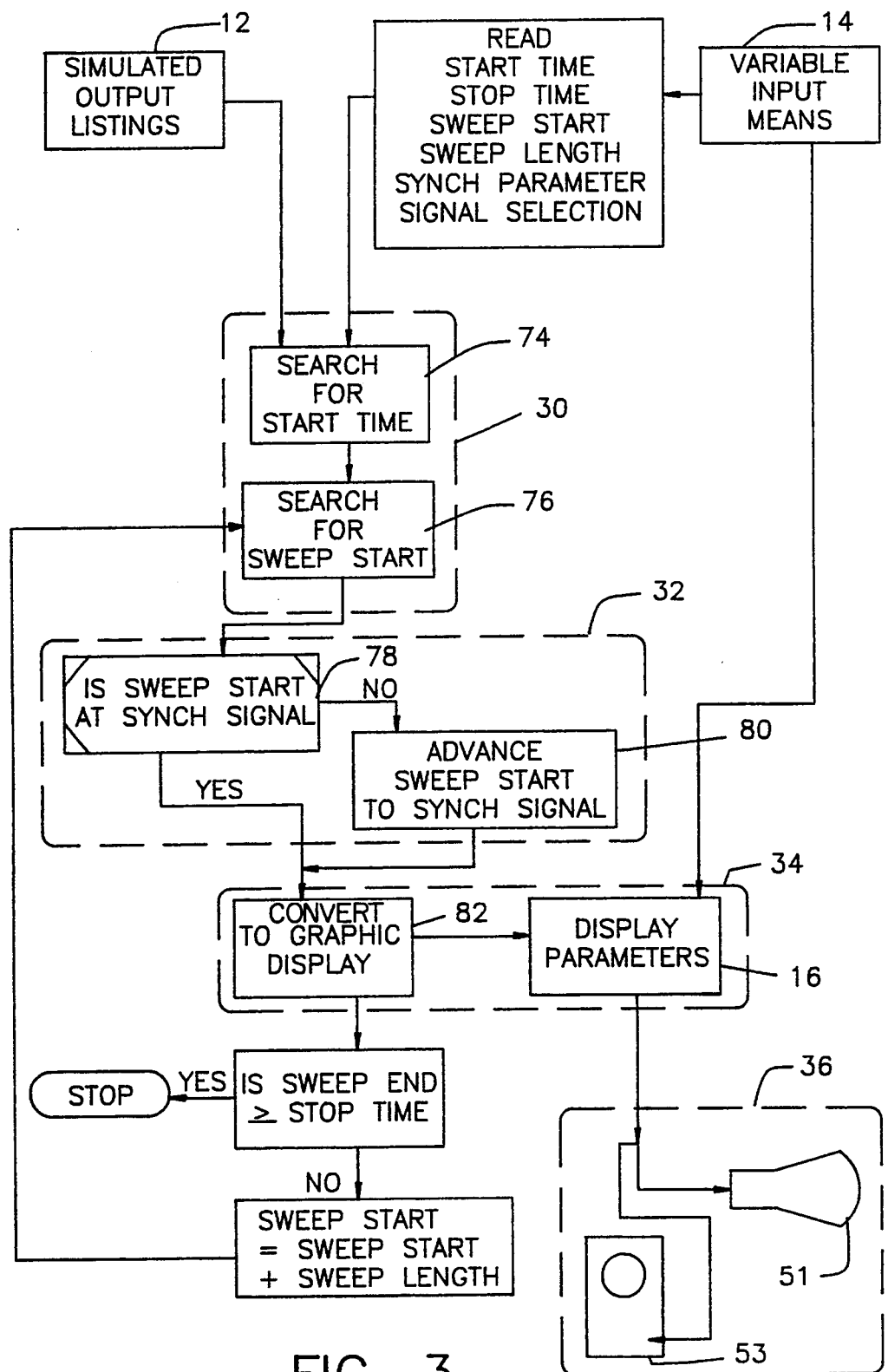
FIG. 3 is a flow diagram shown of a preferred software based embodiment of the present invention.

In FIG. 3 there is shown an alternative embodiment of the present invention, wherein the present invention is formed as a software package to be run on an existing computer system. In such an embodiment, the values for STARTTIME 18, STOPTIME 20, SWEEPSTART 22, SWEEPLENGTH 24, SIGNAL SELECTION 25 and SYNCHRONIZATION PARAMETERS 26 are entered into the present invention system through the computer keyboard or similar user interface. A simulated output listing 12 is created for a theoretical logic circuit using standard methods or a computer data base is accessed that contains previously created simulated output listing data for the theoretical logic circuit being tested. Referring now to FIG. 3 in conjunction with FIG. 1, it can be seen that both the selected variables and the simulated output listings 12 are read into the address set search operation 30. In the preferred software embodiment of the present invention, the address set search operation 30 includes the step 74 of searching the simulated output listing 12 for a time event equal to the chosen STARTTIME 18. If the time event value chosen for the STARTTIME 18 is not equal to the time event value chosen for the SWEEPSTART 22, the address set search operation 30 includes the further step 76 of searching the simulated output listing 12 until a time event is found that is equal to SWEEPSTART 22. With the address corresponding to the SWEEPSTART 22 located within the simulated output listing 12, the synchronization operation 32 is begun. The synchronization operation 32 includes the step 78 of comparing the time event of the chosen SWEEPSTART 22 to a synchronization signal. As has been previously described, the synchronization signal may be generated by a clock pulse generator or the synchronization signal may be chosen from the simulated output listing 12. If the time event of the chosen SWEEPSTART 22 occurs at the same event time as a synchronizing trigger, within the synchronization signal, the value chosen for the SWEEPSTART 22 is maintained. However, if the event time of the chosen SWEEPSTART 22 does not occur at a synchronizing trigger, the additional step 80 is performed, wherein the event time of the chosen SWEEPSTART 22 is changed so as to match the event time of the next synchronizing trigger.

The synchronization operation 32 synchronizes the SWEEPSTART 22 to the synchronization signal. Once synchronized, the data contained within the simulated output listing 12 is read for an event time duration equal to the SWEEPLENGTH 24. The data read during the SWEEPLENGTH 24 is read into the graphic display driver 34. The graphic display driver performs the step 82 of convening the data read from the simulated output listing 12 into a waveform signal. The conversion of the data into waveform signals is further controlled by the variables chosen for the DISPLAY PARAMETERS 34, which dictate the format in which the waveform signals will be displayed. The waveform signals are then forwarded to a computer display screen 51, oscilloscope 53, or other CRT display.

The recursive nature of the present invention system occurs after each SWEEPLENGTH 24 of simulated output listings data is convened into waveform signals. As has been previously described, the conversion of one SWEEPLENGTH 24, of the simulated output listings 12, into waveform signals is referred to as a sweep. A sweep starts at the time event SWEEPSTART 22 and lasts for a SWEEPLENGTH 24. Therefore, the end of each sweep (herein called the SWEEPEND) occurs at a time event that is equal to the value of the SWEEPSTART 22 plus the SWEEPLENGTH 24. The event time of a SWEEPEND is then compared to the event time chosen as the STOPTIME 20. If the SWEEPEND occurs at a time event earlier than the chosen STOPTIME 20, the time event value of the SWEEPSTART 22 is recursively updated by adding the SWEEPLENGTH 24 to the old SWEEPSTART. The above process is then recursively repeated with the new SWEEPSTART 22 until a SWEEPEND occurs at a time event equal to, or greater than, the chosen STOPTIME 20.

Figure 4:
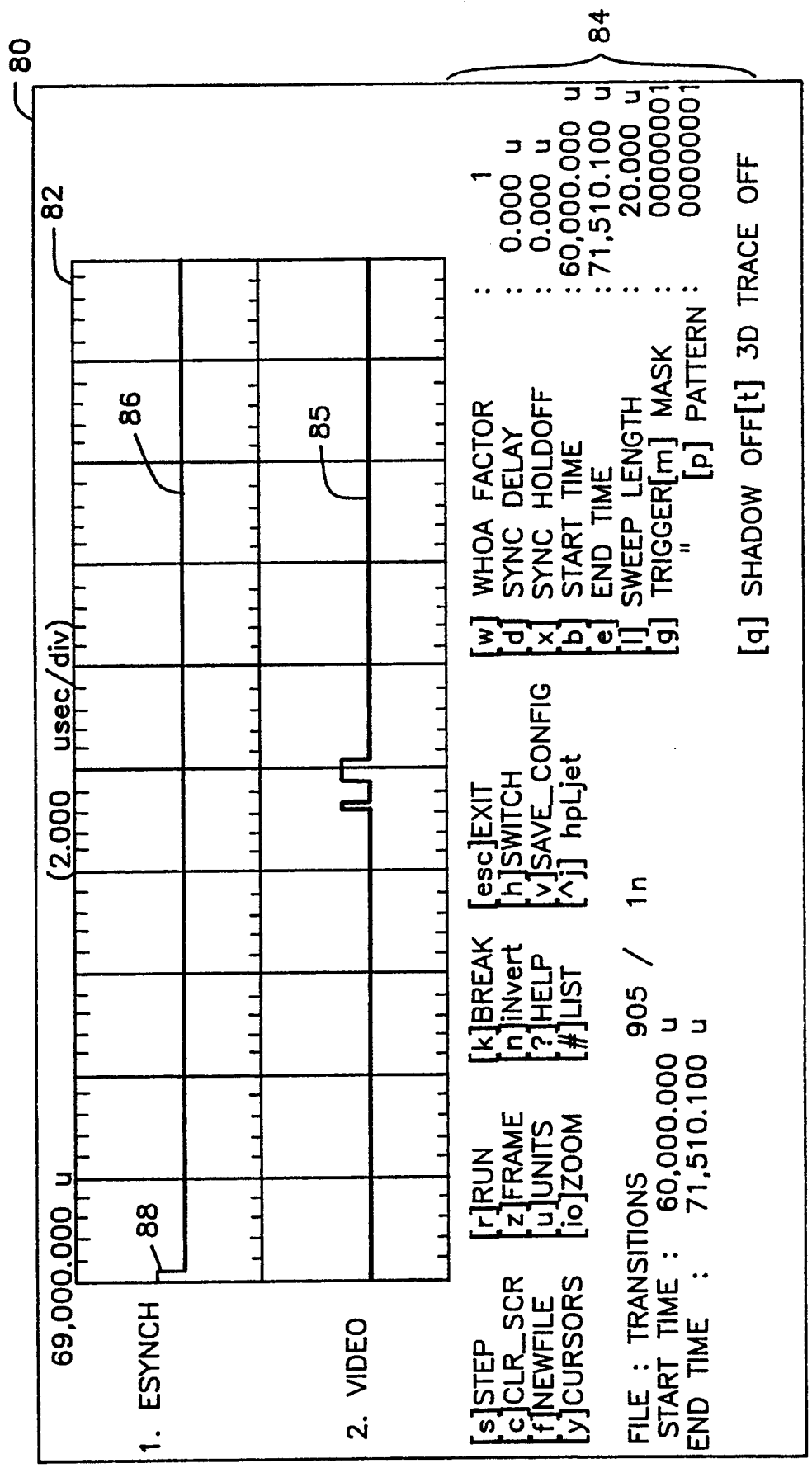
FIG. 4 is a computer display screen image depicting a single waveform image for two test signals generated in accordance with the preferred embodiment of the present invention.

The image produced by the present invention will be better understood by referring to the example waveform display of FIG. 4. FIG. 4, a typical computer screen display image 80 is shown. The display image 80 includes a waveform window display 82, for displaying the waveform images created by graphics display driver 34, as well as a text menu 84 identifying the operating parameters chosen. It will be understood by a person skilled in the art that if the display image 80 were generated on an oscilloscope or similar device, only the waveform window display 82 would be shown. The text menu 84 portion of the display image 80 is typical of that obtainable as part of a software driven computer system. As can be seen from FIG. 4, the waveform image shown in the waveform window display 82, represents a single sweep of the simulated output listings 12, utilizing the exemplary variables previously chosen. The chosen variables are therefore shown in the text menu 84 of the display image 80.

In the exemplary sweep of FIG. 4, the SWEEPLENGTH 24 is chosen at 20,000 nsec. As such, a SWEEPLENGTH of 20,000 nsec is shown across the waveform window display 82. The circuit designer, by varying the display parameters 16, can then choose how to format the waveform window display 82 to best display the chosen SWEEPLENGTH 24. For example, in FIG. 4, the SWEEPLENGTH 24 is 20,000 nsec, and the waveform window display 82 was chosen at a format grid of 2,000 nsec segments. As such, the waveform window display 82 is divided into ten regions, each region being 2,000 nsec in length, thus producing the entire SWEEPLENGTH 24 of 20,000 nsec. It should be understood that the formatting of the waveform window display 82 is arbitrary, depending upon the selected SWEEPLENGTH 24 and the preference of the circuit designer viewing the waveform images.

The waveform images shown in FIG. 4 correspond to a single sweep of the simulated output listing 12 from a SWEEPSTART 22 of 69,000,000 nsecs and a SWEEPLENGTH 24 of 20,000 nsecs. The actual values for the simulated output listing 12 corresponding to this sweep are included in Table One. Referring to Table One in conjunction with FIG. 4, it can be seen that the simulated output listing 12 includes two test signals, a VIDEO signal and an ESYNCH signal. The VIDEO signal and the ESYNCH signal are converted into a VIDEO waveform 85 and an ESYNCH waveform 86 by the graphics display driver 34, and the VIDEO waveform 85, and ESYNCH waveform 86, are shown on the waveform window display 82. The ESYNCH waveform 86 was chosen as the synchronizing signal. As such, when the ESYNCH waveform goes high (Logic 1), a synchronizing trigger 88 produced. In the chosen example, the SWEEPSTART 22 was chosen at 69,000,000 nsec. As can be seen by waveforms shown in FIG. 4, the ESYNCH waveform 86 goes high (Logic 1) at the chosen SWEEPSTART 22 of 69,000,000 nsec for 125 nsec. As such, the VIDEO waveform 85 is properly synchronized at the chosen SWEEPSTART 22 and the SWEEPSTART 22 need not be reset to compensate for an out of synch condition. With the SWEEPSTART 22 properly synchronized, the sweep begins. As can be seen, the VIDEO waveform 85 goes high at 69,008,900 nsec for 100 nsec, and also at 69,009,700 nsec for 400 nsec. In this example, that is the entire activity occurring during the first sweep, and the data contained within the first sweep of the simulated output listing 12 can now be visualized. The chosen SWEEPSTART 22 was chosen at 69,000,000 nsec and the SWEEPLENGTH 24 was chosen at 20,000 nsec. Therefore, the sweep ends at 69,020,000 nsec. With this in mind, it may be expected that the next sweep may begin at 69,020,000 nsec, and then again at 69,040,000 nsec, etc. However, as is apparent from Table One, there is no synchronizing trigger until 69,500,000 nsec. Consequently, the next value for the SWEEPSTART 22 will be set to 69,500,000 nsec so as to be properly synchronized. With the new value for SWEEPSTART 22 calculated, the sweeping of the simulated output listings 12 are recursively repeated in this manner until the current time exceeds the STOPTIME 20 chosen.

In order to provide the most useful visual information, the sweeps of the simulated output listings 12 must be recursively performed as close to real time as possible. By recursively performing the sweeps, a dynamic image is provided, thereby allowing oscilloscope-like analysis of the theoretical logic circuit being designed. However, since the present invention system is testing a theoretical logic circuit, the test data can be manipulated and presented in forms unavailable to an oscilloscope testing a real circuit. Such advantages may include the ability to shift the test signals as desired, invert the test signals, zoom segments of the display, color highlight selected signals, convert the waveforms from analog to digital, etc. Such manipulation of the test data is achieved through software implementation and is readily achieved by a person skilled in the art of programming and knowledgeable of graphical displays.

Figure 5:
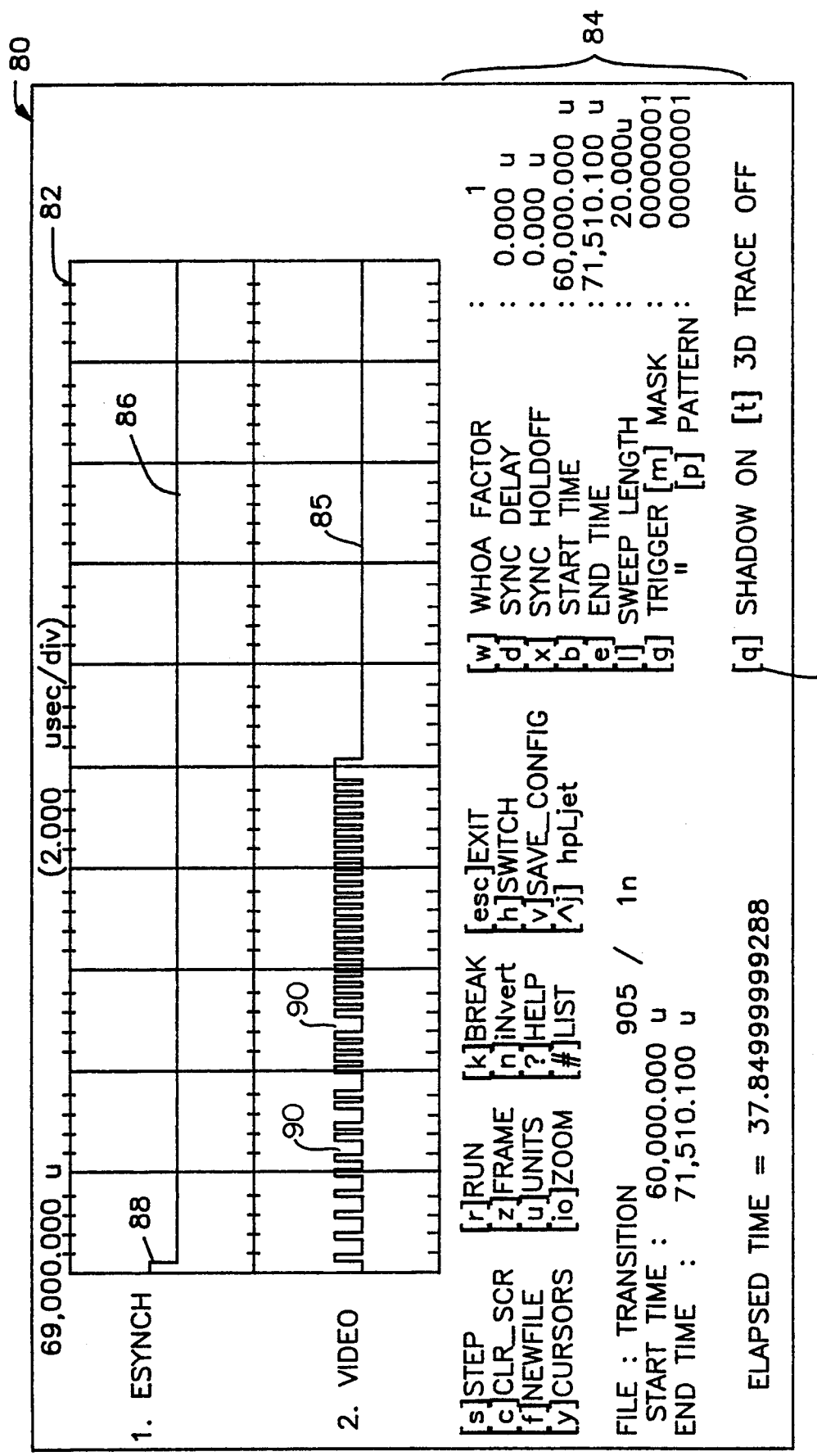
FIG. 5 is a computer display screen depicting multiple superimposed waveform images for a test signal generated in accordance with a preferred embodiment of the present invention.

The present invention system also has the added advantage of being able to display the results of multiple sweeps on a single display so that the time varying nature of a signal can be more readily recognized. Referring to FIG. 5 a display screen is shown, wherein the waveforms from the multiple sweeping of the simulated output listing 12 is shown on screen. As can be seen, the resulting image on the image display 82 is substantially a histogram that is propagated in real time or an oscilloscope with infinite persistence with previous images in different colors. This type of display is useful for detecting motion patterns or for highlighting erratic circuit operation. For example, there are uneven gaps 90 in the video waveform 86 that may indicate a problem with the circuit design, depending on the operational requirements. The production of overlapping waveforms can be software driven, and is shown in the text menu 84 by the option SHADOW 92 being indicated as "ON" in the running program.

Figure 6:
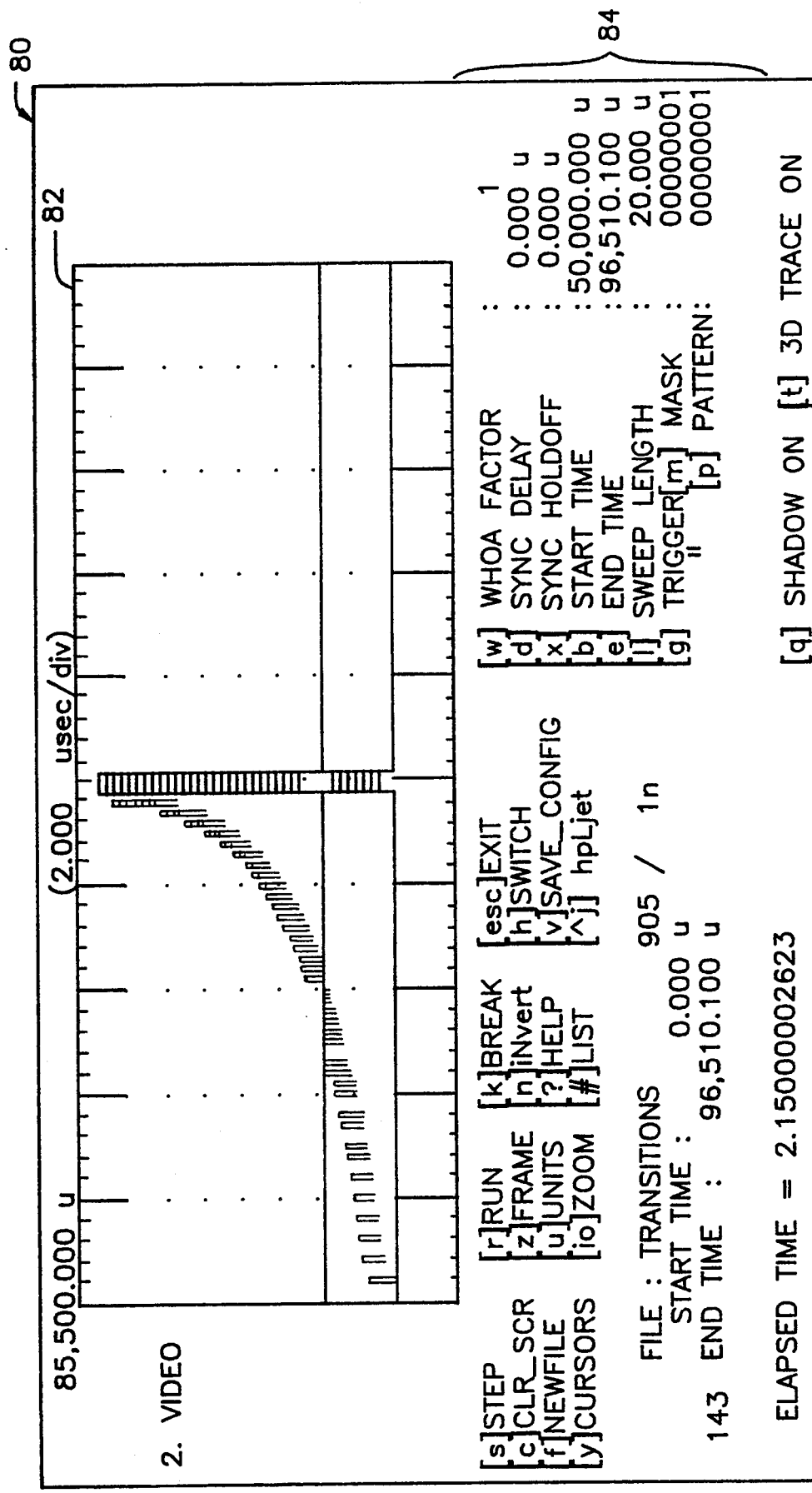
FIG. 6 is a computer display screen depicting multiple superimposed waveform images for a test signal plotted on a parabolic curve and generated in accordance with a preferred embodiment of the present invention.

An additional mode of display for the waveforms provides a three-dimensional effect in order to show disproportioned time variations. For example, the waveforms presented in FIG. 5 actually describe a parabolic function of time, where the spacing between pulses increases by larger amounts as a function of time. Referring to FIG. 6, the parabolic variations are shown graphically, such that each sweep of the display displaces the pulse in a manner representative of movement in the z axes. The parabolic nature of the test data is more readily observed in this format, allowing any unusual variation in the data to be readily detected. The production of a non-linear display can also be implemented by the appropriate software, and is shown in the text menu 84 by the option 3D TRACE 94 being indicated as "ON" in the running program.

Each of these displays could of course exposed to the computer's printer for a permanent record (as was done to create FIGS. 4, 5 and 6.)

It will be understood that the examples used in the above description are merely intended to be exemplary. The described present invention system and method are intended to be used with simulated output listings produced for any theoretical logic circuit design tested with any plurality of simulated test signals. The wave images produced for such a theoretical circuit may include all of the test signals, or any number thereof, and the waveforms can represent either analog or digital signal pulses. It should therefore be apparent that a person skilled in the art may make variations and modifications to the described invention without departing from the spirit and scope of the invention. Furthermore, a person skilled in the art may apply the present invention to applications not herein described where it is advantageous to convert static data into a dynamic display. All such variations and modifications are intended to be included within the scope of the invention as defined by the amended claims.

What is claimed is:

1. An apparatus for converting static simulated test data, produced for a theoretical logic circuit, into a dynamic video display, wherein said simulated test data includes the logic states corresponding to a response of said theoretical logic circuit for a plurality of input signals to said theoretical logic circuit throughout a given time period, said apparatus comprising:

an input means for selecting a plurality of input parameters including at least one of said input signals, a start time and a stop time defining a time interval, said start and stop times occurring during said time period, and a plurality of time segments collectively comprising said time interval;

synchronizing means for synchronizing each time segment with a synchronization signal;

an analysis means for recursively analyzing said time segments whereby logic states corresponding to each said selected input signal occurring during each said analyzed time segment are identified;

a converting means for converting said identified logic states into video signals, said video signals being synchronized with said synchronization signal; and a display means operating in response to said video signals to provide a video representation of said identified logic states in time alignment with said synchronization signal and other of said selected input signals for successive time segments between said start time and said stop time, said successive video representations of said identified logic states thereby constituting a dynamic video representation of said response for said theoretical logic circuit to said selected input signals during said given time period.

2. The apparatus of claim 1, wherein said synchronization signal is selected from said plurality of variables contained within said simulated test data, and wherein said time segment is caused to begin in synchronization with a change in logic state within the synchronization signal.

3. The apparatus of claim 1, wherein said converting means converts said synchronization signal into a video signal and said display means displays the logic states of the variables selected as contained within each time segment along with the synchronization signal.

4. The apparatus of claim 1, wherein said synchronization means includes a comparator means for comparing each said time segment to said synchronization signal and an address means for causing each said time segment to be initiated in synchronization with a change in logic state of the synchronization signal.

5. The apparatus of claim 1, wherein said converting means includes a register means for storing the video signal contained within one said time segment said register means forwarding the stored video signal to said display means at the end of said time segment.

6. The apparatus of claim 5, wherein said converting means includes a signal converting means for converting each video signal between digital and analog.

7. The apparatus of claim 1, wherein said synchronization signal is provided by a clock pulse generating means.

8. The apparatus of claim 1, wherein said synchronization signal can be selectively delayed or advanced in time.

9. The apparatus of claim 8, wherein said display means displays said video images in a selected format that can be selectively altered by an operator.

10. A method of converting simulated logic circuit data into a dynamic video display, wherein said simulated logic data represents a response of a theoretical logic circuit for a plurality of input signals to said theoretical logic circuit over a given time period, said method comprising the steps of:

selecting at least one of said input signals;

selecting a time interval, beginning with a starting time and ending with a stop time, contained within said time period;

dividing said time interval into a plurality of time segments;

synchronizing said time segments to a synchronization signal;

recursively analyzing said time segments for identifying logic states corresponding to each said selected input signal occurring during each said analyzed time segment;

converting said identified logic states into video signals, said video signals being synchronized with said synchronization signal; and consecutively displaying said video signals, in time alignment with said synchronization signal and other of said selected input signals, on a video screen, producing a dynamic video representation of said response for said theoretical logic circuit to said selected input signals during said given time period.

11. The method of claim 10, further including the step of initiating successive time segments in said time interval in correspondence with said synchronization signal.

12. The method of claim 10, further including the step of selecting said synchronization signal from said plurality of variables contained within said simulated logic circuit data.

13. The method of claim 11, further including the step of generating said synchronization signal from a clock pulse generating means.

14. The method of claim 10, further including the step of converting said synchronization signal into a video format and displaying said synchronization signal on said video screen with said video signals.

15. The method of claim 10, further including the step of concurrently displaying the video signals representing each of said selected variables, corresponding to each said time interval, on said video screen.

16. The method of claim 15, wherein said step of superimposing includes displaying said video signals on said video screen in a manner to display variations in the x, y and z axes whereby video signals that do not vary proportionally with time can be visually portrayed as a function at least one axis on said video screen.

17. The method of claim 10, further including the step of selectively formatting said video screen, whereby the size and scale of said video signals displayed on said video screen are controlled by the selected format.

18. The method of claim 10, wherein said synchronization signal can be selectively varied in time by an operator during said step of synchronization.

19. The method of claim 10, wherein said step of displaying said video signals includes displaying said video signals as waveforms.

20. A method of visually analyzing the operational performance of a theoretical logic circuit, prior to the physical construction of said logic circuit, comprising the steps of:

creating a mathematical representation of said logic circuit;

selecting input data corresponding to a plurality of test signals desired to test said logic circuit;

processing said input data through said mathematical representation to produce output data wherein said output data includes logic states corresponding to a response of said logic circuit for each of said test signals expressed across a given time period;

selecting output data, corresponding to at least one of said test signals, to be analyzed;

selecting a time interval, beginning with a start time and ending with a stop time, contained within said time period;

dividing said time interval into a plurality of time segments;

synchronizing each said time segment with a synchronization signal;

recursively analyzing said time segments for identifying logic states corresponding to each said selected input signal occurring during each said analyzed time segment;

converting said identified logic states into a video image, said video images being synchronized with said synchronization signal; and consecutively displaying the video images, in time alignment with said synchronization signal and other of said selected test signals, on a video display, producing a dynamic video representation of said response for said theoretical logic circuit to said selected input signals during said given time period.

21. The method of claim 20, further including the step of initiating successive time segments in said time interval in correspondence with said synchronization signal.

22. The method of claim 21, further including the step of converting said synchronization signal into a video format and displaying said synchronization signal on said video screen with said video images.

23. The method of claim 21, further including the step of selecting said synchronization signal from said plurality of test signals contained within said output data.

24. The method of claim 21, further including the step of generating said synchronization signal from a clock signal generating means.

25. The method of claim 22, further including the step of superimposing each said video image on said video display wherein previous video images are shown on said video display with current video images as each said video image is generated.

* * * * *